(12) United States Patent
Fine (10) Patent No.: US 9,078,078 B1
(45) Date of Patent: Jul. 7, 2015

(54) CALL FORWARDING METHODS AND SYSTEMS

(75) Inventor: Lawrence Ari Fine, Stockbridge, GA (US)

(73) Assignee: Google Inc., Mountain View, CA (US)

( * ) Notice: Subject to any disclaimer, the term of this patent is extended or adjusted under 35 U.S.C. 154(b) by 556 days.

(21) Appl. No.: 13/233,582

(22) Filed: Sep. 15, 2011

(51) Int. Cl.
  H04W 4/00 (2009.01)
  H04W 40/00 (2009.01)
  H04W 68/00 (2009.01)
  H04M 3/42 (2006.01)

(52) U.S. Cl.
  CPC .................................. *H04W 4/00* (2013.01)

(58) Field of Classification Search
  CPC ............. H04M 3/54; H04M 3/42059; H04M 3/42365; H04M 15/8271; H04M 2215/7873; H04M 3/42229; H04M 3/42; H04T 2001/2091; H04T 2001/2095; H04W 40/005; H04W 40/20; H04W 88/02; H04W 88/04; H04W 68/00
  USPC ............ 455/41.2–42.3, 415, 417–421, 432.3, 455/435.1, 455, 456.1–456.3, 456.5–456.6, 455/459, 461–462, 507–508, 550.1, 556.2, 455/561, 567, 569.1–569.2, 575.1, 575.9, 455/432.1, 433–434, 445, 517, 555, 455/557–558, 575.2; 379/201.06–201.08, 379/207.02, 207.11, 211.01–211.02, 379/212.01, 428.02
  See application file for complete search history.

(56) References Cited

U.S. PATENT DOCUMENTS

| | | | |
|---|---|---|---|
| 5,497,149 A | 3/1996 | Fast | |
| 5,557,606 A | 9/1996 | Moon et al. | |
| 5,579,375 A | 11/1996 | Ginter | |
| 5,627,876 A | 5/1997 | Moon | |
| 5,892,819 A | 4/1999 | Stumer | |
| 6,631,187 B1 | 10/2003 | Juhola et al. | |
| 7,116,975 B1 | 10/2006 | Link, II et al. | |
| 7,171,221 B1 | 1/2007 | Amin et al. | |
| 7,295,118 B2 | 11/2007 | Jessup et al. | |
| 7,327,838 B2 | 2/2008 | Smith | |
| 7,450,935 B1 | 11/2008 | Link, II et al. | |
| 7,689,232 B1 | 3/2010 | Beyer, Jr. | |
| 7,941,130 B2 | 5/2011 | Moton, Jr. et al. | |
| 7,957,518 B2 | 6/2011 | Erb | |
| 7,996,001 B2 * | 8/2011 | Vander Veen | 455/417 |
| 8,054,963 B2 * | 11/2011 | Kung et al. | 379/211.02 |
| 8,170,189 B2 * | 5/2012 | Alperin et al. | 379/142.14 |
| 8,515,407 B1 | 8/2013 | Mok et al. | |

(Continued)

FOREIGN PATENT DOCUMENTS

WO  2007118250 A2  10/2007

OTHER PUBLICATIONS google.com, Steelgirder Development, web page, viewed on May 13, 2011.

(Continued)

*Primary Examiner* — Meless Zewdu
(74) *Attorney, Agent, or Firm* — Shumaker & Sieffert, P.A.

(57) ABSTRACT

A call-forwarding method that is implemented using a computer includes storing a profile that is associated with a mobile communications device and at least one additional forwarding destination using the computer; receiving a status indicator; receiving a call that is directed to an identifier that is associated with the profile; and selectively routing the call to the mobile communications device or the additional forwarding destination, based on the status indicator and the profile.

15 Claims, 6 Drawing Sheets

(56) References Cited

U.S. PATENT DOCUMENTS

| | | | |
|---|---|---|---|
| 8,639,230 B2 | 1/2014 | Williams et al. | |
| 8,838,082 B2* | 9/2014 | Vendrow et al. | 455/417 |
| 2001/0026240 A1 | 10/2001 | Neher | |
| 2001/0043586 A1* | 11/2001 | Miloslavsky | 370/352 |
| 2002/0013815 A1* | 1/2002 | Obradovich et al. | 709/204 |
| 2002/0068575 A1 | 6/2002 | Agrawal et al. | |
| 2002/0146104 A1* | 10/2002 | McIntyre | 379/211.02 |
| 2003/0162544 A1 | 8/2003 | Austin et al. | |
| 2004/0072558 A1* | 4/2004 | Van Bosch | 455/417 |
| 2004/0248563 A1 | 12/2004 | Ayers et al. | |
| 2005/0130639 A1 | 6/2005 | Smith | |
| 2005/0215242 A1 | 9/2005 | Black et al. | |
| 2005/0215243 A1* | 9/2005 | Black et al. | 455/417 |
| 2006/0166678 A1 | 7/2006 | Karaoguz et al. | |
| 2006/0223511 A1 | 10/2006 | Hagale et al. | |
| 2007/0032225 A1* | 2/2007 | Konicek et al. | 455/417 |
| 2007/0121911 A1 | 5/2007 | Baudino et al. | |
| 2007/0140216 A1 | 6/2007 | Edelmann et al. | |
| 2008/0049721 A1 | 2/2008 | Ouyang et al. | |
| 2008/0056472 A1* | 3/2008 | Tanemura et al. | 379/201.01 |
| 2008/0133757 A1 | 6/2008 | Etelapera | |
| 2008/0234004 A1* | 9/2008 | Loque et al. | 455/564 |
| 2008/0292074 A1 | 11/2008 | Boni et al. | |
| 2009/0170568 A1* | 7/2009 | Karino | 455/569.2 |
| 2009/0210536 A1 | 8/2009 | Allen et al. | |
| 2009/0215503 A1* | 8/2009 | Zhang et al. | 455/569.1 |
| 2009/0323919 A1 | 12/2009 | Toner et al. | |
| 2010/0093389 A1* | 4/2010 | Asokan et al. | 455/552.1 |
| 2010/0105446 A1* | 4/2010 | Charlier et al. | 455/569.1 |
| 2010/0183134 A1* | 7/2010 | Vendrow et al. | 379/201.06 |
| 2010/0323657 A1* | 12/2010 | Barnard et al. | 455/404.1 |
| 2011/0007901 A1 | 1/2011 | Ikeda et al. | |
| 2011/0034152 A1* | 2/2011 | Khouri et al. | 455/413 |
| 2011/0045990 A1* | 2/2011 | Hansen et al. | 455/41.2 |
| 2011/0059732 A1* | 3/2011 | Cai et al. | 455/417 |
| 2011/0065384 A1 | 3/2011 | Cader et al. | |
| 2011/0070828 A1 | 3/2011 | Griffin et al. | |
| 2011/0122864 A1 | 5/2011 | Cherifi et al. | |
| 2011/0177818 A1 | 7/2011 | Heit et al. | |
| 2011/0189981 A1 | 8/2011 | Faith et al. | |
| 2011/0293084 A1* | 12/2011 | Bhagavatula et al. | 379/211.02 |
| 2012/0115451 A1* | 5/2012 | Roka | 455/417 |
| 2012/0115483 A1 | 5/2012 | Noldus et al. | |
| 2012/0197740 A1 | 8/2012 | Grigg et al. | |
| 2012/0230487 A1* | 9/2012 | Leung et al. | 379/211.02 |

OTHER PUBLICATIONS google.com, Locale Google Voice Plug-In for Android, web page, viewed on May 13, 2011.
Techventus, android-google-voice-locations, web page, viewed on May 13, 2011.
androlib.com, Google Voice Locations, web page, viewed on May 13, 2011.
google.com, GV + Locale?, web page, viewed on May 13, 2011.
"What can NFC do? RIM, NFCLauncher", retrieved from http://forums.crackberry.com/blackberry-bold-9930-9900-f235/what-can-nfc-do-rim-nfcl . . . , accessed on Oct. 20, 2011, 10 pp.
You Tube, "NFCLauncher", retrieved from http://www.youtube.com/watch?v=GqD_oiNY8Js, accessed on Oct. 20, 2011, 2 pp.
google.com, "Steelgirder Development", screenshots [online]. First Accessed on May 13, 2011. 6 pp.
google.com, "Locale Google Voice Plug-In for Android", Google Voice [online]. First Accessed on May 13, 2011. 3 pp.
Techventus, "Android-google-voice-locations", Google Project Housing [online]. First Accessed on May 13, 2011. 1 pp.
"Google Voice Locations", AndroLib.com [online]. First Accessed on May 13, 2011. 4 pp.
google.com, "GV + Locale ?", Google Voice [online]. First Accessed on May 13, 2011. 4 pp.
Smith, "Synchronize Google Voice with Your GPS Location", Lifehacker [online]. Feb. 24, 2010. Retrieved from the Internet: <http://lifehackercom/5479070/synchronize-google-voice-with-your-gps-location> 13 pp.

* cited by examiner

CALL FORWARDING METHODS AND SYSTEMS

TECHNICAL FIELD

The disclosure relates to the field of call forwarding methods and systems, and more particularly, to call forwarding methods and systems for selectively routing a call to a mobile device.

BACKGROUND

In their simplest form, voice communications systems route a voice communication to a destination based upon an identifier that is associated with the destination. As an example, telephone networks commonly route telephone calls to a destination based on a telephone number that is associated with the destination.

Call forwarding systems have long been used to route telephone calls to a destination other than the one specified by the party who initiated the telephone call. In a typical implementation, a user could program a call forwarding system to route calls received by the user's office telephone to a telephone at the user's home.

It has become commonplace for a single person to use multiple communications devices that are each associated with a different telephone number or other identifier. As a consequence, usage of call forwarding systems has increased, and the manner in which call forwarding systems are used has become more complex. For instance, a single user may be reachable at numbers corresponding to a telephone at their home, a telephone at their place of employment, a mobile or non-mobile computer acting as a telephone using software that implements voice over internet protocol technologies, one or more mobile telephones that the user carries on the user's person, and/or one or more telephones that are integrated into the onboard communication systems of an automobile. For some users, the effort that must be expended to manage a call forwarding system could present a barrier to adoption of the system.

SUMMARY

Disclosed herein are methods and systems for call forwarding.

One aspect of the embodiments taught herein is a call forwarding method that is implemented using a computer. The method includes storing a profile that is associated with a mobile communications device and at least one additional forwarding destination using the computer; receiving a status indicator; receiving a call that is directed to an identifier that is associated with the profile; and selectively routing the call to the mobile communications device or the additional forwarding destination, based on the status indicator and the profile.

Another aspect of the embodiments taught herein is a call forwarding method that is implemented using a computer. The method includes storing a profile that is associated with a mobile communications device using the computer; receiving a location indicator; receiving a status indicator; receiving a call that is directed to an identifier that is associated with the profile; determining if the mobile communications device is within a predetermined range of at least one additional forwarding destination that is specified by the profile based on the location indicator; routing the call to the mobile communications device if the mobile communications device is not within the predetermined range of the additional forwarding destination; and selectively routing the call to the mobile communications device or the additional forwarding destination, based on the status indicator, if the mobile communications device is within the predetermined range of the additional forwarding destination.

Another aspect of the embodiments taught herein is a call forwarding method that is implemented using a computer. The method includes storing a profile that is associated with a mobile communications device and at least one additional forwarding destination; receiving a location indicator; receiving a status indicator, wherein the status indicator indicates whether a communications signal between the mobile communications device and an external device is active or inactive; receiving a call that is directed to an identifier that is associated with the profile; determining if the mobile communications device is within a predetermined range of the additional forwarding destination based on the location indicator; routing the call to the mobile communications device if the mobile communications device is not within the predetermined range of the additional forwarding destination; and selectively routing the call to the mobile communications device or the additional forwarding destination, based on the status indicator, if the mobile communications device is within the predetermined range of the additional forwarding destination.

Another aspect of the embodiments taught herein is a call forwarding method that is implemented using a computer. The method includes storing a profile that is associated with a mobile communications device and at least one additional forwarding destination using the computer; receiving a location indicator from the mobile communications device; receiving a status indicator from the mobile communications device, wherein the status indicator indicates whether a communications signal between the mobile communications device and an external device is active or inactive; requesting an updated location indicator in response to a change of the status indicator; receiving a call that is directed to an identifier that is associated with the profile; determining if the mobile communications device is within a predetermined range of the additional forwarding destination based on the location indicator; and routing the call to the mobile communications device if the mobile communications device is not within the predetermined range of the additional forwarding destination.

BRIEF DESCRIPTION OF THE DRAWINGS

The various features, advantages and other uses of the present apparatus will become more apparent by referring to the following detailed description and drawings in which.

DETAILED DESCRIPTION

Call forwarding systems can be utilized to reroute a phone call to a desired destination, which is typically identified by a telephone number. As a user's location changes, the user may wish to change the destination to which their calls are being forwarded. For certain users, the result is that the user is tasked with updating their call forwarding settings multiple times per day. In addition, the user's location is not always a sufficient basis from which to determine their call forwarding intentions, and systems for providing location information regarding the user's location may not be sufficiently accurate to serve as a sole basis for determining the user's call forwarding intentions. The disclosure herein is directed to methods and systems where the user's location and/or other circumstances are utilized as a basis for dynamically rerouting telephone calls without the need for active management of the call forwarding system by the user.

Figure 1:
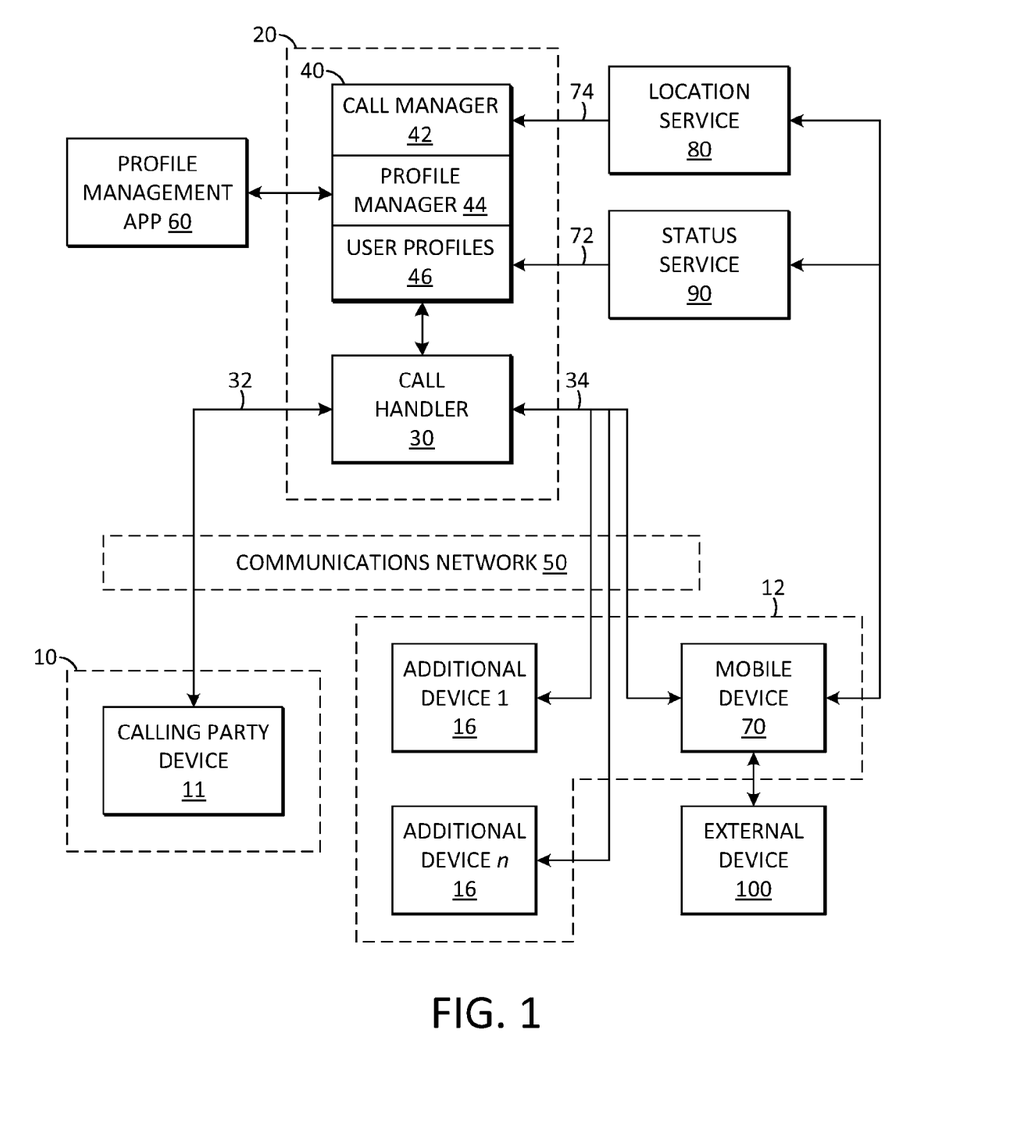
FIG. 1 is a diagram showing a call forwarding system implemented in an example environment.

As shown in FIG. 1, a call forwarding system 20 includes a call handler 30 and a call forwarding server 40. The call handler 30 is connected to a communications network 50 and routes calls from a calling party 10 to a called party 12 over the communications network 50.

The calls are selectively routed by the call handler 30 to a device that is associated with the called party 12 as directed by the call forwarding server 40. The call forwarding server 40 selectively routes the calls based on information provided by the called party 12 using a profile management application 60, and information regarding the called party 12 that is provided by a mobile communications device or a mobile telecommunications device such as a mobile device 70 that is associated with the called party 12. The mobile device 70 can be a cellular telephone. The information provided by the mobile device 70 can include location information regarding the called party 12 that is provided by a location service 80 in the form of a location indicator 74. The information provided by the mobile device can include status information that is provided by a status service 90 in the form of a status indicator 72. The status indicator 72 can relate to an external device 100. The calls are selectively routed to the mobile device 70 or to an additional device, such as one of the first through $n^{th}$ additional devices 16 that are associated with the called party 12.

Communications Network

The call handler 30 is connected to the communications network 50. Any suitable type of communications network now known or later developed can be utilized as the communications network 50. As one example, all or part of the communications network 50 can be the Public Switched Telephone Network (PSTN). Wireless communications networks, such as cellular voice and data networks can form all or part of the communications network 50. IP based networks such as the Internet can form all or part of the communications network 50. The communications network 50 can be multiple communications networks of different types working together.

Calling Party

The calling party 10 refers to a person or entity of any type from which a call originates. Herein the calling party 10 may also be referred to as the origin of a call or the originator of a call. The calling party 10 can be or include a device 11 associated with a person or organization that places a call either manually, or using an automated calling system. The device 11 can be a communications device or telecommunications device such as a landline telephone or a cellular telephone.

The term "call" is used to denote a communication that is directed to an identifier, such as a telephone number, that is associated with the called party 12. Communications other than telephone calls are included within the scope of the term "call."

The identifier to which the call made by the calling party 10 is directed is sometimes referred to herein as a called number. The identifier need not, however, be a number. Other identifiers can be used, such as alphanumeric identifiers, depending upon the system used.

Called Party

The called party 12 refers to a person, entity or system that is associated with the called number. The mobile device 70 and the first through $n^{th}$ additional devices 16 are associated with the called party 12.

The mobile device 70 can be a cellular telephone. Other types of devices can be used as the mobile device 70. For example, a tablet computer, a laptop computer, or any other mobile computing device equipped with telephony hardware or a software component that is operable to place and/or receive calls (e.g. a "softphone") can be used as the mobile device 70.

The first through $n^{th}$ additional devices 16 can be mobile, such as a cellular telephone, or non-mobile, such as a landline telephone. Other types of devices can be used as the first through $n^{th}$ additional devices 16. For example, a tablet computer, a laptop computer, or any other mobile computing device equipped with telephony hardware or a software component that is operable to place and/or receive calls (e.g. a "softphone") can be used as the first through $n^{th}$ additional devices 16. The first through $n^{th}$ additional 16 can include a single device or multiple devices.

Call Handler

The call handler 30 is configured to send and receive communications, such as telephone calls. The call handler 30 can be configured to receive a telephone call and to selectively route the call to a desired destination, as directed by the call forwarding server 40, as will be explained in detail herein.

An incoming call 32 is routed to the call handler 30 by the communications network 50. The incoming call 32 can be routed by the communications network 50 on the basis of an incoming call identifier, such as the called number. The incoming call 32 is one instance of numerous incoming calls that are received by the call handler 30, and numerous called numbers can be routed to the call handler 30 as incoming calls.

An outgoing call 34 is delivered to the communications network 50 by the call handler 30. The call handler 30 routes the outgoing call 34 to a destination. The destination for each outgoing call 34 is specified by an outgoing call identifier, such as a telephone number. A telephone number that is utilized as the outgoing call identifier may be referred to herein as a forwarding number. The outgoing call 34 is one instance of numerous outgoing calls that are routed by the call handler 30, and numerous forwarding numbers can be associated with the outgoing calls.

Call Forwarding Server

The call forwarding server 40 can be implemented using a single computer or multiple computers that are configured to perform the functions described herein. These functions are performed using software that is provided to and executed by the call forwarding server 40. The call forwarding server 40 and the call handler 30 can be implemented as separate systems in communication with one another, or as a single system.

The call forwarding server 40 can include a call manager 42, a profile manager 44, and a plurality of user profiles including a profile 46. The call manager 42 is comprised of software executed by the call forwarding server 40 that is configured to receive an identifier from the call handler 30 and output an instruction to the call handler 30 as to how the call should be routed. The identifier can be the incoming call identifier, such as the called number. The instruction as to how to route the phone call can be the outgoing call identifier, such as the forwarding number.

The profile manager 44 of the call forwarding server 40 is configured to store the profile 46. The user profile 46 is associated with a specific incoming telephone number. The profile 46 is associated with a specific mobile communications device, such as the mobile device 70. This association can be in the form of a forwarding rule that is configured to forward an incoming call to the mobile communications device. The association of the profile 46 with the mobile device 70 can also be in the form of a forwarding rule that includes one or more conditions that are based upon status information or location information relating to the mobile communications device, as represented by the status indicator 72 and the location indicator 74, respectively. The association of the mobile device 70 with the call forwarding server 40 also allows the call forwarding server 40 to receive the status indicator 72 and the location indicator 74 from the mobile device 70 and store them as part of the profile 46 or as data that is associated with the profile 46.

Upon receiving the incoming call identifier from the call handler 30, the call forwarding server 40 accesses the profile 46 that is associated with the incoming call identifier. For example, where the incoming call identifier is the called number, the call handler 30 accesses the profile 46 that is associated with the called number. The call forwarding server 40 then determines how to route the call based on information that is contained within the profile 46.

Each profile 46 includes one or more forwarding rules, each of which is associated with one or more forwarding destinations. The forwarding destination can be described by a telephone number or any other identifier that can be utilized to route a call. The forwarding rules each include one or more conditions that must be satisfied in order to forward the incoming call to the forwarding destination that is associated with the forwarding rule. Each forwarding rule can specify a single forwarding destination, or can specify multiple forwarding destinations, in which case the call can be forwarded to multiple forwarding destinations concurrently or sequentially if the forwarding rule is satisfied.

The call forwarding server 40 can receive the location indicator 74 from the location service 80. The profile 46 can dictate whether the location indicator 74 is to be used to route the call, and if so, how the call is to be routed using the location indicator 74. If the location indicator 74 is to be utilized in routing the call, the call forwarding server 40 receives the location indicator 74 from the location service 80 and then determines how to route the call based on information that is contained in the profile 46 and based on the location information that is received from the location service 80 in the form of the location indicator 74.

The call forwarding server 40 can receive status information regarding the mobile device 70 from the status service 90 in the form of the status indicator 72. The profile 46 can dictate whether the status indicator 72 is to be used to route the call, and if so, how the call is to be routed using the status indicator 72. If the status indicator 72 is to be utilized in routing the call, the call forwarding server 40 receives the status indicator 72 from the status server 90 and then determines how to route the call based on information that is contained in the profile 46 and based on the status information.

The call forwarding server 40 can consider both location information and status information when determining how to route the call. If status information and location information are to be utilized in routing the call, the call forwarding server 40 receives the location indicator 74 from the location service 80, receives the status indicator 72 from the status service 90, and then determines how to route the call based on information that is contained in the profile 46 and based on the location indicator 74 and the status indicator 72.

The call forwarding server 40 can be configured to consider additional factors as part of the forwarding rules by which the call forwarding server determines how to route the call. As one example, the identity of the calling party 10 can be used a basis for determining how to route the call. As an example, the identity of the calling party 10 can be determined by the call forwarding server 40 on the basis of an identifier, such as a phone number, associated with the device 11 utilized by the calling party 10. The identity of the calling party 10 can be invoked by forwarding rules on an individual basis, for example, in a forwarding rule that always routes calls from a specific calling party to the mobile device 70. The identity of the calling party 10 can be invoked by forwarding rules based on membership of the calling party 10 in a group, for example, in a forwarding rule that routes all calls from calling parties that are members of a "co-workers" group to a device at the user's place of business.

Profile Management Application

A profile management application 60 can be provided to allow the user to interface with the profile manager 44 of the call forwarding server 40. The profile management application 60 can be a web application that is provided by the profile manager 44 and is accessible using a computer and web browser, using a handheld mobile device and a web browser that is installed on the handheld mobile device, or using any other means for accessing a web application. The profile management application 60 can be an application that is installed on a computer, on a handheld mobile device, or on any other suitable device. The profile management application allows the user to establish the profile 46, associate the mobile device 70 with the profile 46, associate one or more forwarding destinations with the profile, and define one or more forwarding rules. Each forwarding rule specifies a forwarding destination, to which the call is forwarded if the rule is satisfied, and a condition or set of conditions that must be satisfied to invoke the forwarding rule.

The profile management application 60 also allows the user to set geographic locations for use in the forwarding rules. These locations can be specified by latitude and longitude. The current position of the mobile device 70 can be used to set the locations. A map-based interface can be used to set the locations.

Location Service

The location service 80 is configured to generate the location indicator 74 and transmit the location indicator 74 to the call forwarding server 40. The location service 80 includes software that is resident on and executed by the mobile device 70. The location service 80 may include a server external to the mobile device 70 that performs any or all of the functions of generating the location indicator 74 based on location information received from the mobile device 70, storing the location indicator 74, transmitting the location indicator 74 to the call forwarding server 40, and other related functions. As an example, the location service 80 could include a server external to the mobile device 70 that periodically receives location information and/or the location indicator 74 from the mobile device 70, and then relays the location indicator 74 to other services, such as the call forwarding server 40, upon receiving a request from the other services.

The location indicator 74 is generated on the basis of signals received from one or more hardware subsystems of the mobile device 70. The location information represented by the location indicator 74 corresponds to the physical location of the mobile device 70. As an example, the location information can be derived by the location service 80 using a positioning system that is incorporated in the mobile device 70 and output as the location indicator 74. A suitable positioning system is the Global Positioning System (GPS). As another example, the position of the mobile device can be calculated based on signals received from broadcast stations having fixed geographic locations, for example, cellular phone towers. Other systems can be utilized.

The location indicator 74 can be in the form of latitude and longitude coordinates. As an alternative example, the location information could be processed by the location service 80 into the location indicator 74 in the form of a designation representing presence of the mobile device 70 within a predetermined distance from a point of interest, such as the user's home, place of business, school, club, etc. Similar processing can be performed by the call forwarding server 40. Any other suitable form can be used for the location indicator 74.

In all of the examples provided in this application the location service 80 provides the location information and/or the location indicator 74 only to services that have been authorized by the user of the mobile device 70 to receive such information. Additional actions can be taken to protect the privacy of the user, such as encrypting or anonymizing the location information and/or the location indicator 74.

Status Service

The status service 90 is configured to generate the status indicator 72 and transmit the status indicator 72 to the call forwarding server 40. The status service 90 includes software that is resident on and executed by the mobile device 70. The status service 90 may include a server external to the mobile device 70 that performs any or all of the functions of generating the status indicator 72, storing the status indicator 72, transmitting the status indicator 72 to the call forwarding server 40, and other related functions. As an example, the status service 90 could include a server external to the mobile device 70 that periodically receives status information and/or the status indicator 72 from the mobile device 70, and then relays the status indicator 72 to other services, such as the call forwarding server 40, upon receiving a request from the other services.

The status indicator 72 includes information that can be used as a basis for determining the user's call forwarding intentions, as a supplement or as an alternative to the location information represented by the location indicator 74. The status indicator 72 can be generated based on inputs received by the mobile device 70. Examples of inputs from which the status indicator can be generated include usage of the mobile device 70, a locked or unlocked state of the mobile device 70, connection of the mobile device 70 to a battery charger, movement of the mobile device 70 as detected by accelerometer inputs, and the status of various subsystems of the mobile device 70, such as communications subsystems. As an alternative or in addition, the status can be generated by one of the first through $n^{th}$ additional devices 16. For example, where the first through $n^{th}$ additional device 16 is a computer, the status indicator could be generated based on activity of the computer, where an inactive status is assigned if the computer is locked, logged out, or hasn't been used within a predetermined time period, and an active status is assigned if the computer is unlocked, logged in, or has been used within a predetermined time period.

In a specific example, the status indicator 72 that is received by the call forwarding server 40 from the mobile device 70 indicates whether a communications signal between the mobile device 70 and the external device 100 is active or inactive. This communications signal can be any suitable protocol. Specific examples of protocols contemplated as the communications signal include Bluetooth and IEEE 802.11.

One specific example of a device that can serve as the external device 100 is a communications headset, such as a headset employing Bluetooth or RF radio technologies, which is coupled to the mobile device 70 to allow calls to be placed or received using the audio capabilities of the headset. When a headset is coupled to the mobile device 70 as the external device 100, this can serve as a basis for inferring that the user wishes to receive calls using the mobile device 70. A related example is a non-headset based hands free telephony system, such as a vehicle-based hands free communications system, which can be coupled to the mobile device 70 as the external device 100.

Another specific example of a device that can serve as the external device 100 is a wireless network device, such as a wireless network router. In this case, the status indicator 72 can serve as a secondary indication as to the movement or location of the user of the mobile device 70. For example, based on the availability of a specific wireless network, it can be inferred that the mobile device 70 has changed position. This position change might not be recognized based on the location indicator 74, if there are limitations as to the frequency of updates of the location indicator 74 or if there are limitations regarding the accuracy of the location indicator 74. In this situation, an active communications signal between the mobile device 70 and the external device 100 can serve as a basis for determining that a call should be routed to a forwarding destination other than the forwarding destination that would be determined on the basis of the location indicator 74 alone.

Another specific example of a device that can serve as the external device 100 is an electronic device with a generally fixed geographic location, such as a personal computer. Protocols such as Bluetooth can be used to determine that the mobile device is in the vicinity of the personal computer that is serving as the external device 100. In this situation, an active communications signal between the mobile device 70 and the external device 100 in the form of a personal computer can serve as a basis for inferring that a call should be routed to a specific forwarding destination that is located in the vicinity of the personal computer. An inactive state for the communications signal between the mobile device 70 and the external device 100 in the form of a personal computer can serve as a basis for inferring that a call should not be routed to the forwarding destination that is located in the vicinity of the personal computer. This can also be the case where the location information 74 would otherwise dictate selecting the forwarding destination that is located in the vicinity of the personal computer.

Forwarding Rules

Table I shows example forwarding rules that can be stored in the profile 46 as a rule set using the profile management application 60. The example rules described herein are stated in functional terms. For example, in rule 1-1, the determination as to whether "Location=home" is true or false can be carried out based upon a comparison of latitude and longitude values for "home" that are encoded in the rule or otherwise incorporated into the profile 46 with latitude and longitude values that are encoded in the location indicator 74. Likewise, the forwarding destination "Home Phone" can be encoded in the rules or otherwise incorporated into the profile in terms of an identifier that is usable by the call handler 30 to route the outgoing call 34, such as a phone number.

The example rules shown in Table I are based solely upon location. In each of rules 1-1 and 1-2, the forwarding destination is determined solely on the basis of the location indicator 74. As an example, with reference to Rule 1-1, if the location of the mobile device 70, as indicated by the location indicator 74, is within a predetermined distance from the geographic location that is designated as "home" the forwarding destination "Home Phone" is selected, and the outgoing call 34 is routed to the phone number or other identifier associated with "Home Phone." The forwarding rules in the rule set of Table I can be invoked in order until one is satisfied, with the first rule satisfied determining the forwarding destination. A default forwarding destination can be set for use if no forwarding rules are satisfied, as represented by Rule 1-3.

The result of the example rule set of Table I is that the call is routed to multiple destinations if the mobile device 70 is not within a predetermined range of the either of the additional forwarding destinations specified by Rules 1-1 and 1-2. If the mobile device 70 is within the predetermined range of one of the additional forwarding destinations, such as one of the first through $n^{th}$ additional devices 16, the call is selectively routed based on Rules 1-1 and 1-2.

TABLE I

| Rule No. | Rule | Forwarding Destination |
|---|---|---|
| 1-1 | Location = home | Home Phone |
| 1-2 | Location = office | Office Phone |
| 1-3 | [no rules satisfied] | Home Phone AND Office Phone AND Mobile Device |

The example rules shown in Table II are based solely upon status. In each of rules 2-1 through 2-5, the forwarding destination is determined solely on the basis of the status indicator 72. Thus, in these examples, the call forwarding system 20 selectively routes the call to the mobile device or the forwarding destination, based on the status indicator, if the mobile communications device is within the predetermined range of the forwarding destination.

As an example, with reference to Rule 2-1, if the status indicator 72 indicates that a mobile headset is active as the external device 100, the forwarding destination "Mobile Device" is selected, and the outgoing call 34 is routed to the phone number or other identifier associated with "Mobile Device." The forwarding rules in the rule set of Table II can be invoked in order until one is satisfied, with the first rule satisfied determining the forwarding destination. A default forwarding destination can be set for use if no forwarding rules are satisfied, as represented by Rule 2-6 of Table II.

The result of the example rule set of Table II is that the call is selectively routed to the mobile device 70, as specified by Rules 2-1 and 2-3, or to one or more of the additional forwarding destinations, as specified by Rules 2-3 through 2-8.

TABLE II

| Rule No. | Rule | Forwarding Destination |
|---|---|---|
| 2-1 | Status = wireless headset active | Mobile Device |
| 2-2 | Status = vehicle-based hands free communications system active | Mobile Device |
| 2-3 | Status = mobile device unlocked | Mobile Device |
| 2-4 | Status = mobile device connected to battery charger | Home Phone |
| 2-5 | Status = wireless network "Home" active | Home Phone |
| 2-6 | Status = wireless network "Office" active | Office Phone |
| 2-7 | Status = Bluetooth connection with office computer active | Office Phone |
| 2-8 | [no rules satisfied] | Home Phone AND Office Phone AND Mobile Device |

The example rules shown in Table III are based upon location and status. In each of rules 3-1 through 3-8, the forwarding destination is determined on the basis of the status indicator 72 and the location indicator 74. As an example, with reference to Rule 3-1, if the status indicator 72 indicates that a mobile headset is active as the external device 100 and the location indicator 74 indicates that the physical location of the mobile device 70 corresponds to the location "office," the forwarding destination "Mobile Device" is selected, and the outgoing call 34 is routed to the phone number or other identifier associated with "Mobile Device." Alternatively, with reference to Rule 3-3, if the status indicator 72 indicates that a mobile headset is inactive as the external device 100 and the location indicator 74 indicates that the physical location of the mobile device 70 corresponds to the location "office," the forwarding destination "Office" is selected, and the outgoing call 34 is routed to the phone number or other identifier associated with "Office."

Together, Rules 3-1 and 3-2 serve as an example of a situation in which the call forwarding system 20 selectively routes the call to the mobile device 70 or an additional forwarding destination, such as one of the first through $n^{th}$ additional devices 16, based on the status indicator 72, when the mobile communications device is within a predetermined range of the additional forwarding destination, as represented by the location indicator 74.

The forwarding rules in the rule set of Table III can be invoked in order until one is satisfied, with the first rule satisfied determining the forwarding destination. A default forwarding destination can be set for use if no forwarding rules are satisfied, as represented by Rule 3-9 of Table III.

The result of the example rule set of Table III is that the call is routed to the mobile device 70 if the mobile device 70 is not within a predetermined range of either of the additional forwarding destinations specified by Rules 3-1 through 3-8. The call is selectively routed to either of the mobile device 70, as in Rules 3-2, 3-4, 3-6, and 3-8 or one of the additional forwarding destinations specified by Rules 3-1, 3-3, 3-5, and 3-7 based on the status indicator 72, when the mobile device 70 is within the predetermined range of the additional forwarding destinations specified by those rules.

TABLE III

| Rule No. | Rule | Forwarding Destination |
|---|---|---|
| 3-1 | Location = home AND Status = wireless headset inactive | Home Phone |
| 3-2 | Location = home AND Status = wireless headset active | Mobile Device |

TABLE III-continued

| Rule No. | Rule | Forwarding Destination |
|---|---|---|
| 3-3 | Location = office AND Status = wireless headset inactive | Office Phone |
| 3-4 | Location = office AND Status = wireless headset active | Mobile Device |
| 3-5 | Location = office AND Status = wireless network "Break Room" inactive | Office Phone |
| 3-6 | Location = office AND Status = wireless network "Break Room" active | Mobile Device |
| 3-7 | Location = office AND Status = Bluetooth connection with office computer active | Office Phone |
| 3-8 | Location = office AND Status = Bluetooth connection with office computer inactive | Mobile Device |
| 3-9 | [no rules satisfied] | Home Phone AND Office Phone AND Mobile Device |

The example rule set shown in Table IV includes rules that are based upon location or status. In each of rules 4-1 through 4-8, the forwarding destination is determined on the basis of either the status indicator 72 or the location indicator 74. By processing the rules in sequence, the call forwarding system 20 selectively routes the call to the mobile device 70 or the additional forwarding destinations, such as one of the first through $n^{th}$ additional devices 16, based on the status indicator 72 and the location indicator 74. As an example, in a system that processes the rules of Table IV in sequence, Rule 4-6 is invoked if Rules 4-1 through 4-5 are not satisfied, based on the status indicator 72, and Rule 4-6 is satisfied, based on the location indicator 74.

TABLE IV

| Rule No. | Rule | Forwarding Destination |
|---|---|---|
| 4-1 | Status = wireless headset active | Mobile Device |
| 4-2 | Status = vehicle-based hands free communications system active | Mobile Device |
| 4-3 | Status = wireless network "Home" active | Home Phone |
| 4-4 | Status = wireless network "Office" active | Office Phone |
| 4-5 | Status = Bluetooth connection with office computer active | Office Phone |
| 4-6 | Location = home | Home Phone |
| 4-7 | Location = office | Office Phone |
| 4-8 | Location = park | Mobile Device |
| 4-9 | [no rules satisfied] | Mobile Device |

The example rule set shown in Table V includes rules that are based upon location and status, and also includes rules that are based on factors other than location and status. In each of rules 5-1 through 5-9, the forwarding destination is determined on the basis of the status indicator 72, the location indicator 74, or an additional factor. By processing the rules in sequence, the call forwarding system 20 selectively routes the call to the mobile device 70 or the additional forwarding destination, such as one of the first through $n^{th}$ additional devices 16, based on the status indicator 72, the location indicator 74, and the additional factors.

TABLE V

| Rule No. | Rule | Forwarding Destination |
|---|---|---|
| 5-1 | Time = 10:00 PM - 8:00 AM | Voicemail |
| 5-2 | CallerGroup = "coworkers" | Office Phone |
| 5-3 | Caller = Boss | Voicemail |
| 5-4 | Status = Accelerometer Motion Detected | Mobile Device |

TABLE V-continued

| Rule No. | Rule | Forwarding Destination |
|---|---|---|
| 5-5 | Status = Mobile Device Usage in Last 5 Minutes | Mobile Device |
| 5-6 | Status = wireless headset active | Mobile Device |
| 5-7 | Status = Bluetooth connection with office computer active | Office Phone |
| 5-8 | Location = home | Home Phone |
| 5-9 | Location = office | Office Phone |
| 5-10 | [no rules satisfied] | Mobile Device |

The example rules and rule sets described above are representative of the types of rules that could be utilized by the call forwarding server 40 as a basis for determining how to forward calls. The concepts above can be combined with other types of rules. Other suitable types of rules and rule sets can be utilized.

System Operation

Initially, the user of the call forwarding system 20 creates the profile 46. This can be done using the profile management application 60. The profile is associated with an identifier, such as a telephone number that directs calls to the call forwarding system 20. During creation or later modification of the profile 46, the mobile device 70 is associated with the profile 46, and the first through $n^{th}$ additional devices 16 are also associated with the profile 46. The user defines one or more forwarding rules that are stored as a part of the profile 46 for later use by the call forwarding system 20 for selectively routing calls to the mobile device 70 or to one of the first through $n^{th}$ additional devices 16.

Figure 2:
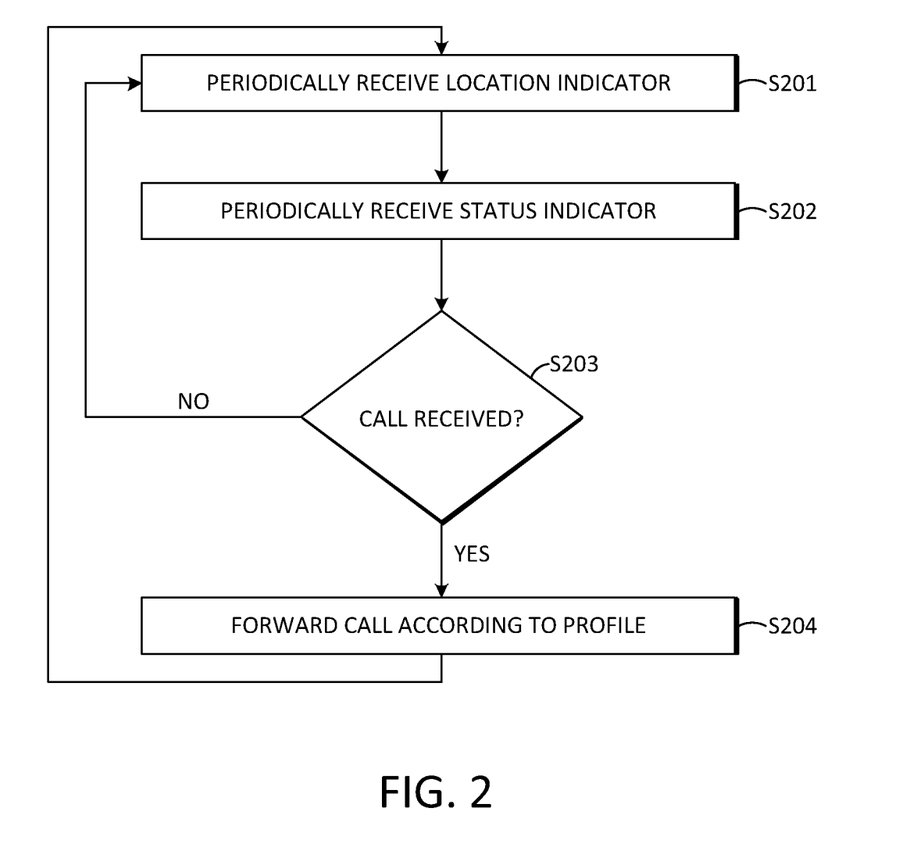
FIGS. 2-4 are flowcharts showing processes for call forwarding.

After the profile 46 is established, normal operation of the call forwarding system 20 commences. In one mode of operation, as shown in FIG. 2, the call forwarding server 40 receives the location indicator 74 from the mobile device 70 in operation S201 and stores the location indicator 74 in association with the profile 46. In operation S202, the call forwarding server 40 receives the status indicator 72 from the mobile device 70 and stores the status indicator 72 in association with the profile 46. Operations S201 and S202 do not necessarily occur in the order described, and do not necessarily occur with the same frequency.

In operation S203 a determination is made as to whether a call has been received. Operations S201 and S202 are be performed periodically if no call is received, as represented by a "NO" determination in operation S203. As used herein "periodically" does not necessarily require that the actions be performed at fixed temporal intervals, although this could be the case. Instead, "periodically" means that the actions occur from time to time. For example, operations S201 and S202 could occur as a result of the mobile device 70 sending the status indicator 72 and the location indicator 74 only when the indicator changes value. In another example, the location indicator 74 and/or the status indicator 72 can be changed based on an age of the information, such as by deleting the indicator after a selected time period.

If a call is received, as represented by a "YES" determination in operation S203, the process proceeds to operation S204. In operation S204, the call is forwarded based information contained in the profile 46, such as the forwarding rules, as previously discussed.

Figure 3:
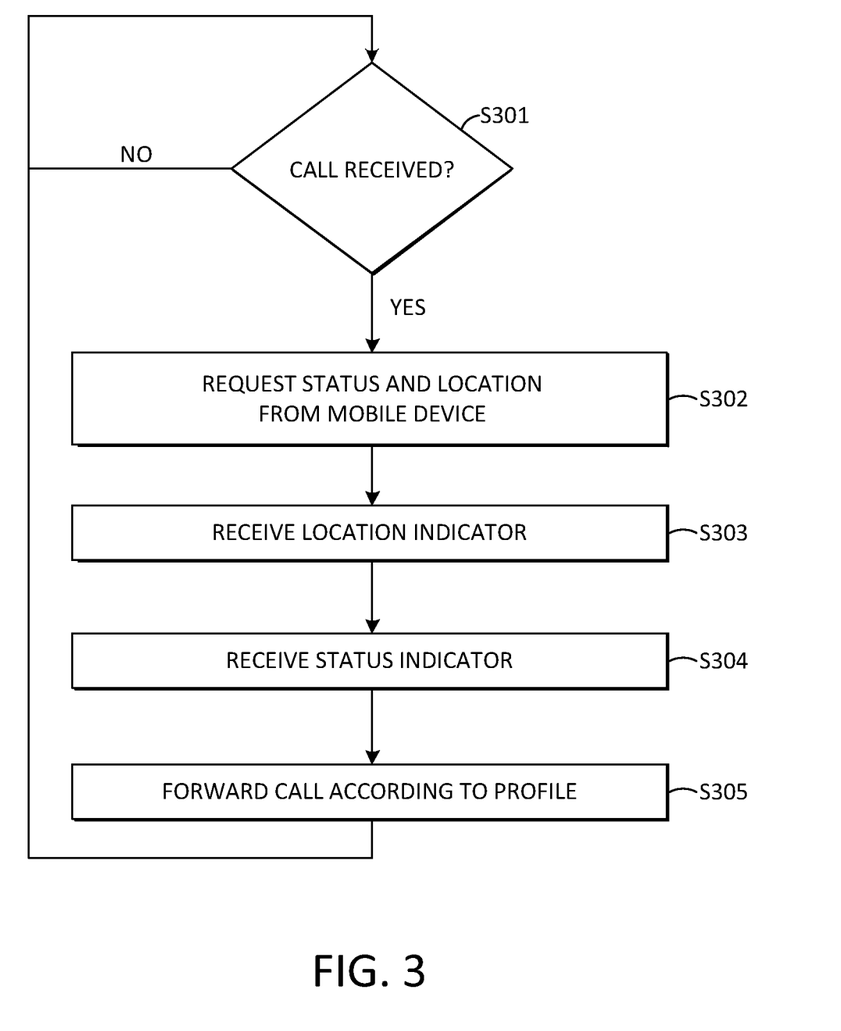

In another mode of operation, as shown in FIG. 3, a determination is made as to whether a call is received in operation S301. This continues until a "YES" determination is made, and the process proceeds to operation S302.

In operation S302, the call forwarding server requests the status indicator 72 and the location indicator 74 from the mobile device 70. In response to the request made in operation S302, the call forwarding server 40 receives the location indicator 74 from the mobile device 70 in operation S303 and stores the location indicator 74 in association with the profile 46. In response to the request made in operation S302, the call forwarding server 40 receives the status indicator 72 from the mobile device 70 in operation S304 and stores the status indicator 72 in association with the profile 46.

In operation S305, the call is forwarded based information contained in the profile 46, such as the forwarding rules, as previously discussed.

Figure 4:
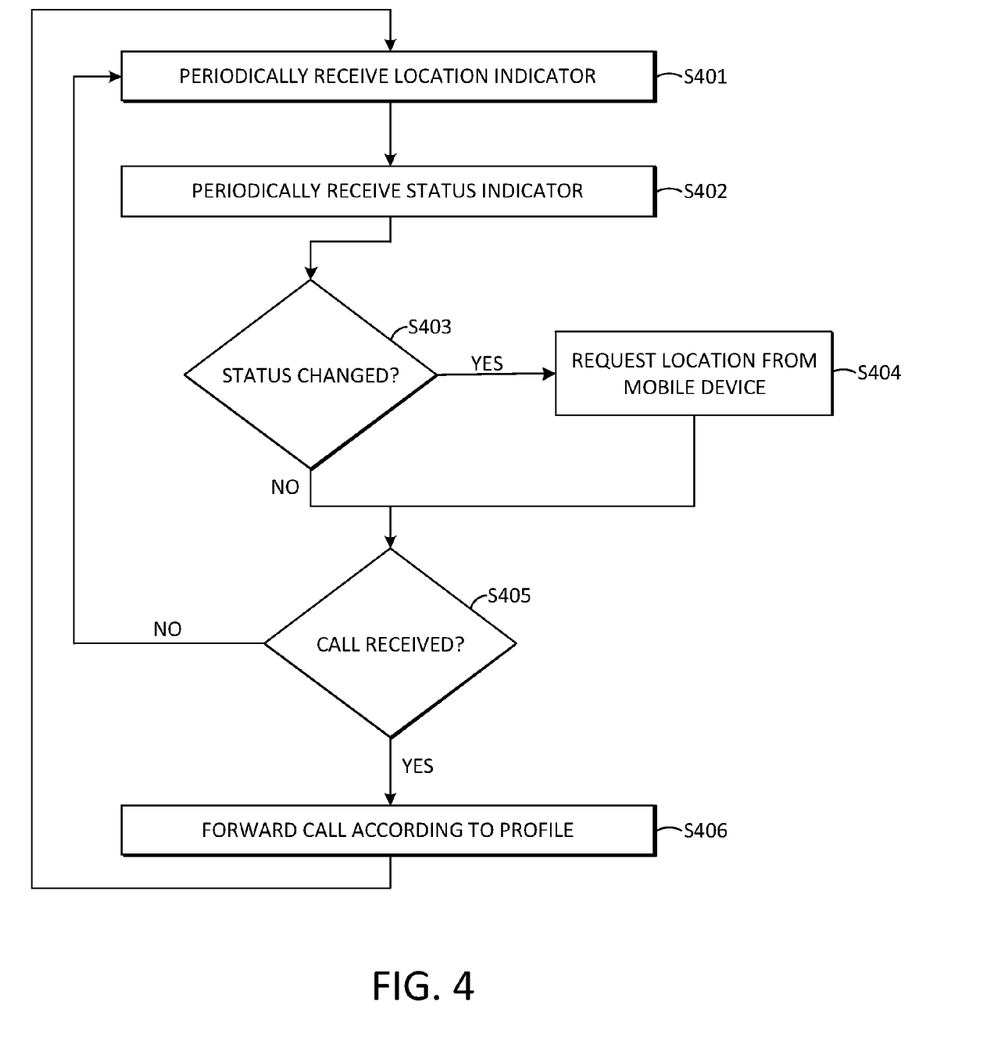

In another mode of operation, as shown in FIG. 4, the call forwarding server 40 receives the location indicator 74 from the mobile device 70 in operation S401 and stores the location indicator 74 in association with the profile 46. In operation S402, the call forwarding server 40 receives the status indicator 72 from the mobile device 70 and stores the status indicator 72 in association with the profile 46. Operations S401 and S402 do not necessarily occur in the order described, and do not necessarily occur with the same frequency.

In operation S403, the call forwarding server 40 determines whether the status indicator 72 has changed. In response to a change in the status indicator, in operation S404, the call forwarding server 40 sends a request to the mobile device 70 for an updated location indicator.

In operation S405 a determination is made as to whether a call has been received. If a call is received, as represented by a "YES" determination in operation S405, the process proceeds to operation S406. In operation S406, the call is forwarded based on information contained in the profile 46, such as the forwarding rules, as previously discussed.

Implementation

The call handler 30, the call forwarding server 40, the location service 80 and the status service 90 can be implemented in the form of one or more machines or devices capable of performing the described functions. These devices could be or include a processor, a computer, specialized telecommunications hardware or any other device. The described functionality can be embodied in software instructions that are executable by the device or devices.

As used herein, the term "computer" means any device of any kind that is capable of processing a signal or other information or instructions. Examples of computers include, without limitation, an application-specific integrated circuit (ASIC) a programmable logic array (PLA), a microcontroller, a digital logic controller, a digital signal processor (DSP), a desktop computer, a laptop computer, a tablet computer, and a mobile device such as a mobile telephone. A computer does not necessarily include memory or a processor. A computer may include software in the form of programmable code, micro code, and or firmware or other hardware embedded logic. A computer may include multiple processors which operate in parallel. The processing performed by a computer may be distributed among multiple separate devices, and the term computer encompasses all such devices when configured to perform in accordance with the disclosed embodiments.

Figure 5:
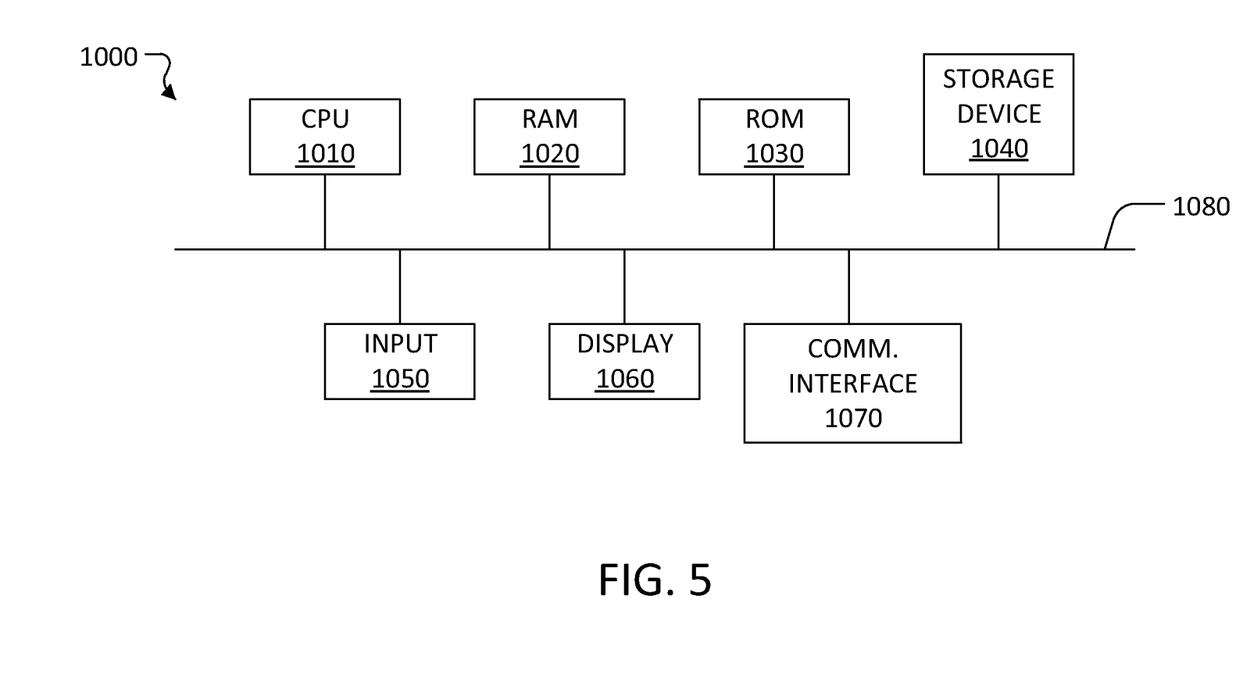
FIG. 5 is a block diagram showing a computer.

An example of a device that can be used as a basis for implementing the systems and functionality described herein is a computer 1000, as shown in FIG. 5. The computer 1000 can be any suitable computer. As an example, the computer 1000 includes a processor such as a central processing unit (CPU) 1010 and memory such as RAM 1020 and ROM 1030. A storage device 1040 can be provided in the form of any suitable computer readable medium, such as a hard disk drive. One or more input devices 1050, such as a keyboard and mouse, a touch screen interface, etc., allow user input to be provided to the CPU 1010. A display 1060, such as a liquid crystal display (LCD) or a cathode-ray tube (CRT), allows output to be presented to the user. A communications interface 1070 is any manner of wired or wireless means of communication that is operable to send and receive data or other signals using the communications network 50. The CPU 1010, the RAM 1020, the ROM 1030, the storage device 1040, the input devices 1050, the display 1060 and the communications interface 1070 are all connected to one another by a bus 1080.

Figure 6:
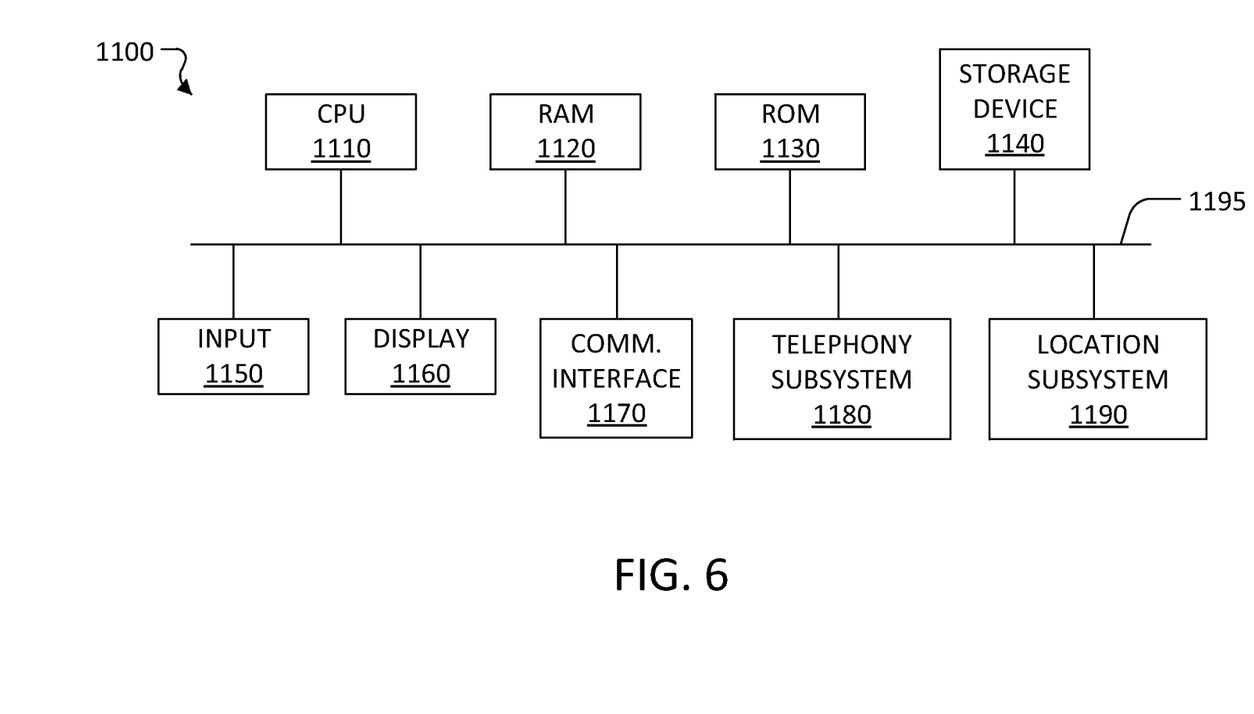
FIG. 6 is a block diagram showing a mobile device.

The mobile device 70 can be a cellular telephone 1100, as shown in FIG. 6. The cellular telephone 1100 can include a processor such as a central processing unit (CPU) 1110 and memory such as RAM 1120 and ROM 1130. A storage device 1140 can be provided in the form of any suitable computer readable medium, such as a hard disk drive. One or more input devices 1150, such as a keypad, a touch screen interface, etc., allow user input to be provided to the CPU 1110. A display 1160, such as a liquid crystal display (LCD), allows output to be presented to the user. A communications interface 1170 includes one or more voice and data communications interfaces of any type now known or later conceived. A telephony subsystem 1180 provides functions necessary for placing and receiving telephone calls. A location subsystem 1190 is used to determine the physical location of the cellular telephone 1100, such as by latitude and longitude. As an example, the location subsystem 1190 could be a satellite navigation receiver that is operable to utilize a satellite navigation system. One example of a suitable satellite navigation system is the Global Positioning System (GPS). The CPU 1110, the RAM 1120, the ROM 1130, the storage device 1140, the input devices 1150, the display 1160, the communications interface 1170, the telephony subsystem 1180 and the location subsystem 1190 are all connected to one another by a bus 1195.

While a single calling party 10, called party 12, and profile 46 have been described, it should be understood that numerous called parties can establish profiles using the call forwarding server 40, and numerous calling parties will contact one or more called parties. The call forwarding system 20 can be scaled as necessary to handle a large volume of calls simultaneously.

While the disclosure is directed to what is presently considered to be the most practical embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:
1. A method comprising:
storing, by a computer, a profile that is associated with a mobile communications device;
receiving, by the computer, a location indicator;
receiving, by the computer, a status indicator indicating a movement of the mobile communications device detected by an accelerometer of the mobile communications device;
receiving a call that is directed to an identifier associated with the profile;

determining if the mobile communications device is within a predetermined range of at least one additional forwarding destination that is specified by the profile based on the location indicator;
if the mobile communications device is not within the predetermined range of any of the at least one additional forwarding destination, routing, by the computer, the call to the mobile communications device; and
if the mobile communications device is within the predetermined range of the at least one additional forwarding destination, selectively routing, by the computer and based on the status indicator, the call to the mobile communications device or to the at least one additional forwarding destination, wherein selectively routing the call to the mobile communications device or to the at least one additional forwarding destination comprises:
if the status indicator indicates that the mobile communications device is moving, routing the call to the mobile communications device.

2. The method of claim 1, wherein the location indicator includes latitude and longitude information for the mobile communications device.

3. The method of claim 1, wherein the identifier is a telephone number.

4. The method of claim 1, wherein selectively routing the call to the mobile communications device or to the at least one additional forwarding destination comprises:
if the status indicator indicates that the mobile communications device is not moving, routing the call to one or more of the at least one additional forwarding destination.

5. A method comprising:
storing, by a computer, a profile that is associated with a mobile communications device and at least one additional forwarding destination using the computer;
receiving, by the computer, a location indicator;
receiving, by the computer, a status indicator, wherein the status indicator indicates whether a communications signal between the mobile communications device and an external device is active or inactive;
receiving a call that is directed to an identifier that is associated with the profile;
determining, by the computer, if the mobile communications device is within a predetermined range of the at least one additional forwarding destination based on the location indicator;
if the mobile communications device is not within the predetermined range of the at least one additional forwarding destination, routing, by the computer, the call to the mobile communications device; and
if the mobile communications device is within the predetermined range of the at least one additional forwarding destination, selectively routing, by the computer and based on the status indicator, the call to the mobile communications device or to the at least one additional forwarding destination.

6. The method of claim 5, wherein selectively routing, by the computer and based on the status indicator, the call to the mobile communications device or to the at least one additional forwarding destination comprises routing the call to the mobile communications device if the status indicator indicates that the communications signal between the mobile communications device and the external device is active.

7. The method of claim 6, wherein the external device is a communications headset.

8. The method of claim 6, wherein the external device is a vehicle-based hands free communications system.

9. The method of claim 6, wherein the external device is a wireless network device.

10. The method of claim 5, wherein selectively routing, by the computer and based on the status indicator, the call to the mobile communications device or to the at least one additional forwarding destination comprises routing the call to the mobile communications device if the status indicator indicates that the communications signal between the mobile communications device and the external device is inactive.

11. The method of claim 10, wherein the external device is a personal computer.

12. The method of claim 10, wherein the external device is a wireless network router.

13. The method of claim 5, wherein the identifier is a telephone number.

14. A method comprising:
storing, by a computer, a profile that is associated with a mobile communications device and at least one additional forwarding destination using the computer;
receiving, by the computer, a location indicator from the mobile communications device;
receiving, by the computer, a status indicator from the mobile communications device, wherein the status indicator indicates whether a communications signal between the mobile communications device and an external device is active or inactive;
requesting, by the computer, an updated location indicator in response to a change of the status indicator;
receiving a call that is directed to an identifier that is associated with the profile;
determining, by the computer and based on the updated location indicator, if the mobile communications device is within a predetermined range of the at least one additional forwarding destination; and
if the mobile communications device is not within the predetermined range of the at least one additional forwarding destination, routing, by the computer, the call to the mobile communications device.

15. The method of claim 14, wherein the identifier is a telephone number.

* * * * *